United States Patent [19]

Horike et al.

[11] 4,172,000

[45] Oct. 23, 1979

[54] METHOD AND DEVICE FOR FIXING MOLDING ON WINDSHIELDS

[75] Inventors: Masayoshi Horike, Yokosuka; Kenji Fukuda, Fujisawa; Shigeru Kimura, Kamakura, all of Japan

[73] Assignees: Nifco Inc.; Nissan Motor Corp., both of Tokyo, Japan

[21] Appl. No.: 904,370

[22] Filed: May 10, 1978

[30] Foreign Application Priority Data

May 18, 1977 [JP] Japan ................................. 52/56290

[51] Int. Cl.² .......................... E04B 1/62; B60J 1/02; A44B 21/00
[52] U.S. Cl. ................................. 156/108; 24/73 FT; 29/453; 52/208; 52/211; 52/400; 52/718; 52/824; 296/93
[58] Field of Search ............... 156/108, 71, 293; 29/526 R, 509, 453, 450; 296/93, 84 D; 52/208, 211, 212, 205, 718, 717, 716, 397, 398, 399, 400, 821, 822, 823, 824; 24/73 FT, 73 PC, 73 MC, 73 BC, 81 BA

[56] References Cited

U.S. PATENT DOCUMENTS

| | | | |
|---|---|---|---|
| 3,750,358 | 8/1973 | Lewkowitz | 52/400 |
| 3,981,697 | 9/1976 | Buckthorpe | 52/508 |
| 4,135,277 | 1/1979 | Taniai et al. | 52/400 |

Primary Examiner—Michael W. Ball
Attorney, Agent, or Firm—Jack R. Halvorsen; Robert W. Beart

[57] ABSTRACT

A glass plate is attached through the medium of an adhesive layer to the bottom of a stepped portion which is formed along the edge of a window frame. Along the edge of the glass plate, there are fixed supporting pieces which have movable holding pieces supported thereon in such a way as to enjoy freedom of motion in directions perpendicular to the edge of the glass plate, the movable holding pieces each being provided with a claw adapted to provide engagement with the edge of a molding. The fixing of the molding to the edge of the window frame is accomplished by first causing the movable holding pieces to be moved on the supporting pieces to their respective positions prescribed for attachment of the molding and subsequently pushing the molding downwardly along the lateral surface of the stepped portion formed along the edge of the window frame, whereby the engaging claws of the movable holding pieces now held at positions for the attachment of the molding will automatically come into engagement with the edge of the molding.

12 Claims, 8 Drawing Figures

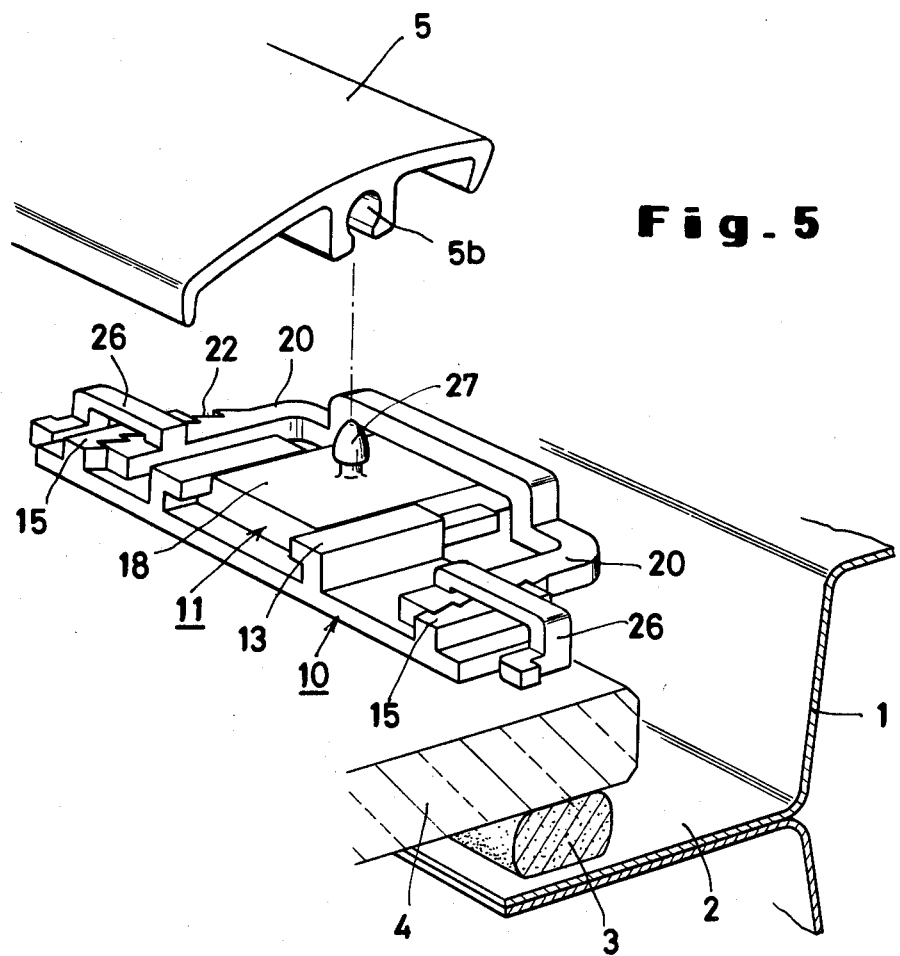

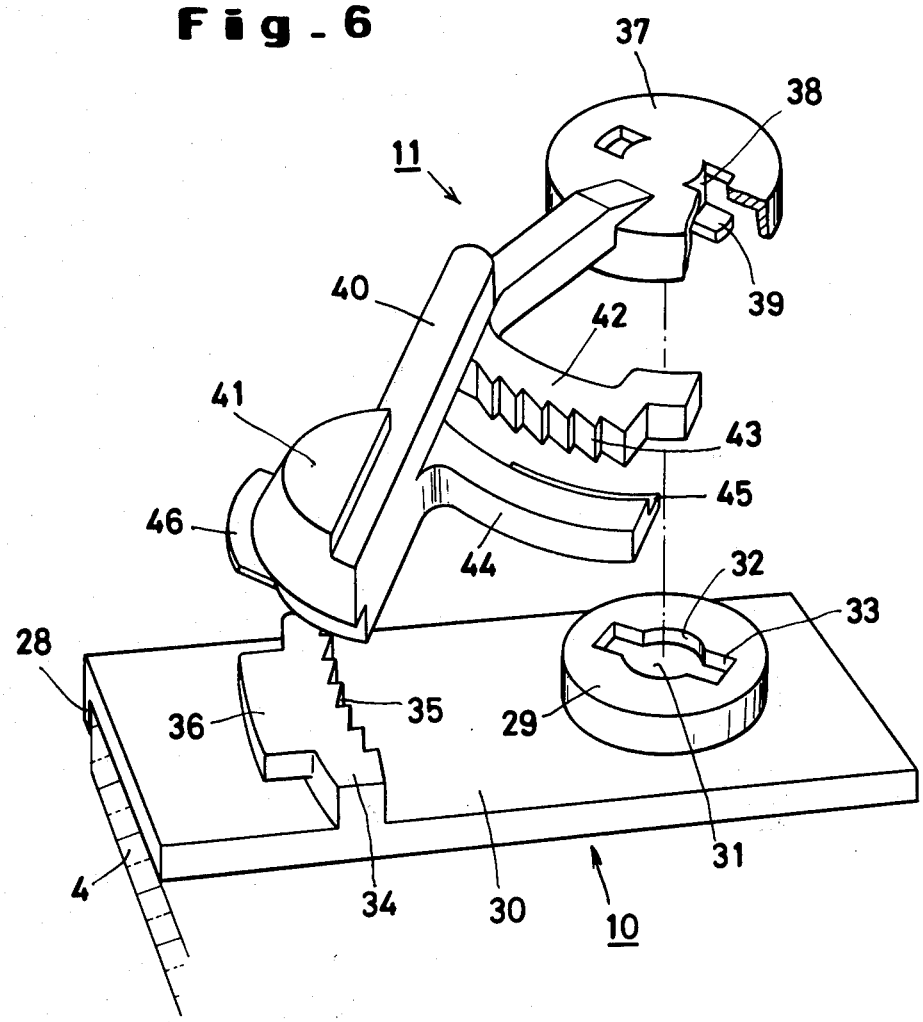

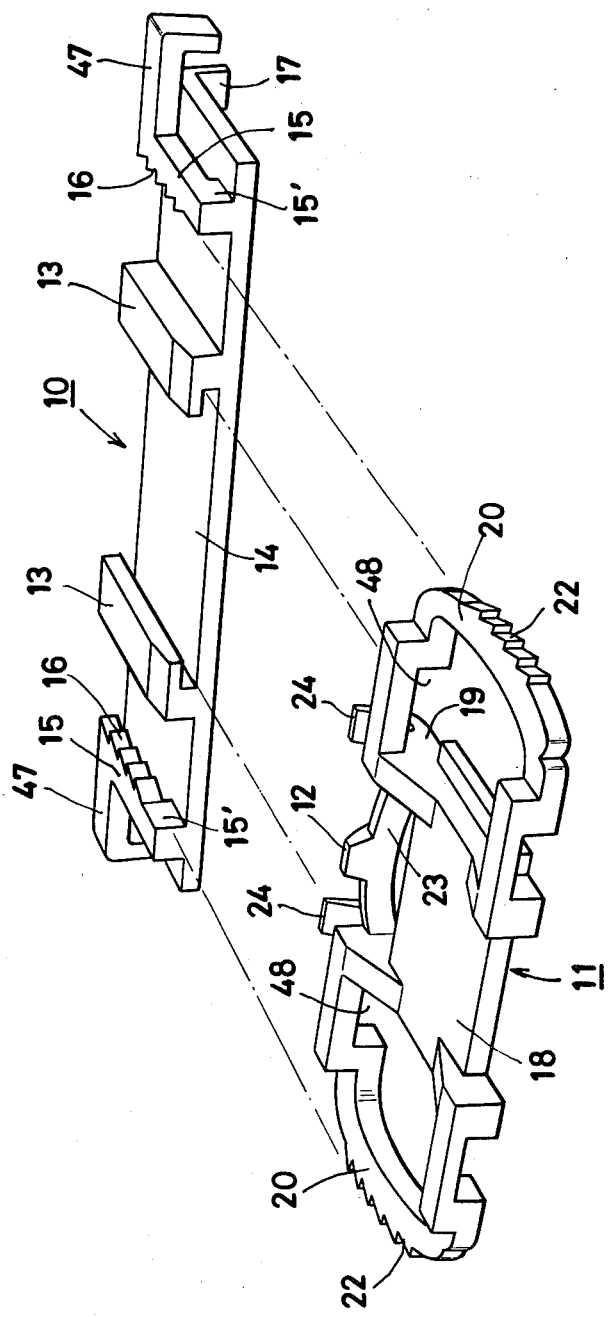

METHOD AND DEVICE FOR FIXING MOLDING ON WINDSHIELDS

BACKGROUND OF THE INVENTION

This invention relates to a method for fixing a molding along the edge of a glass plate such as in the windshield or rear window of an automobile, for example, and to a device to be used for fixing the molding by the method. In the case of an automobile, it has been customary to form the windshield or rear window in the automobile body by a method which comprises pressing a stepped portion along the edge of a window frame, forming an adhesive layer along the peripheral area of the bottom face of the stepped portion and fastening a glass plate through the medium of the adhesive layer to the stepped portion. In this case, a molding is set along the edge of the glass plate to conceal the unsightly opening between the edge of the glass plate and the lateral face of the stepped portion for the purpose of ensuring a good appearance. There has heretofore been suggested a method whereby clips serving to keep the molding in fast engagement with the opening are supported and fixed in position by means of T-shaped studs which are fixed such as by welding to the edge or lateral face of the stepped portion. This method, however, is not advantageous because it entails the problems of greater cost and susceptibility to rusting due to the work of welding.

With a view to eliminating the various disadvantages suffered by the conventional methods for the fixation of moldings, the inventors have invented improved molding pins and have filed the inventions for U.S. patents under Ser. No. 799,863 under date of May 23, 1977, now abandoned and Ser. No. 844,015 under date of Oct. 20, 1977. With the conventional molding chips including those developed by the inventors, if the size of the glass plate and that of the stepped portion are constant, it is difficult to have the edge of the glass plate fastened to the lateral face of the stepped portion uniformly at a prescribed interval throughout the entire length of the lateral face and it is, additionally, difficult to uniformize the thickness of the adhesive layer throughout the entire length of the stepped portion. Consequently, there are inevitably involved errors, i.e. an error due to possible loss of the uniformity of the fastening of the glass plate within the stepped portion and an error in the vertical position of the glass plate from the bottom face of the stepped portion due to a possible variation in the thickness of the adhesive layer to be formed in the stepped portion. Since the conventional clips are invariably incapable of absorbing such errors, the interposed opening may be too wide at some parts for the molding to preclude unwanted play and too narrow at other parts for the molding to be easily set in position. To overcome this drawback, there have been suggested molding clips of a construction as disclosed by Japanese Utility Model Application No. 119051/1975 (Utility Model Public Disclosure No. 32824/1977). The molding clips permit the molding to be fastened to the opening notwithstanding the errors by a procedure of attaching receiving pieces at required positions on the molding, fixing the clips along the edge of the glass plate at positions opposed to the positions at which the receiving pieces are attached, causing the receiving pieces to slide under pressing pieces provided on the clips until the outer edge of the molding comes into colliding contact with the lateral face of the stepped portion for thereby causing the pressing pieces of the clips to press the receiving pieces onto the edge of the glass and bringing the molding into a fixed state.

According to this particular prior art, the desired fixation of the molding cannot be accomplished unless the positions at which the receiving pieces are attached to the molding and the positions at which the corresponding clips are fixed along the edge of the glass plate are thoroughly in agreement. The work of bringing those positions into exact agreement, however, calls for much time and labor. Moreover, since the fixation of the molding by this method is effected by causing the receiving pieces to move on the glass plate and slide under the pressing pieces of the clips, the efficiency of the fixed operation using the clips is much inferior to the conventional method whereby the fixation of the molding is accomplished by pressing the molding into snapping engagement with the opening. This difficulty stands out all the more because the glass plate used in the windshield or rear window of an automobile is generally curved and the molding used therefor must be curved in conformity therewith, because the molding is not straight but curved and, therefore, cannot easily be moved uniformly on the curved glass plate throughout the entire length thereof and because the work of fixing the molding cannot be performed while simultaneously keeping an eye on accurate positional correspondence between the receiving pieces and the clips.

When the glass plate in the windshield or rear window of an automobile is broken or cracked or the molding is injured or dented, it becomes necessary to replace the glass plate or molding. To permit the replacement, therefore, the molding must be detachable. The prior art described above has not given any thought to the detachability of the molding and, therefore, renders the required replacement of glass plate or molding difficult.

An object of this invention is to provide a method and device for fixing a molding, whereby the molding is detachably fixed in position easily by merely causing the molding to be inserted downwardly into position without necessitating any positional adjustment of the clips and without reference to possible errors arising in the attachment of the glass plate to the edge of the window frame.

SUMMARY OF THE INVENTION

To accomplish the object described above, the present invention provides an improvement in and concerning a method involving the steps of applying an adhesive layer to the periphery of the glass plate or to the bottom of a stepped portion formed along the edge of a window frame, fastening a glass plate through the medium of the adhesive layer to the stepped portion and setting a molding in position in the opening interposed between the edge of the glass plate and the lateral face of the stepped portion in such a way as to conceal the opening from view, said improvement combining a method and a device. The device comprises supporting pieces adapted to be fixed along the edge of the glass plate and movable holding pieces provided with holding means serving to hold in position the downwardly inserted molding and supported by the supporting pieces in such a way that the holding means enjoys freedom of motion in directions substantially perpendicular to the edge of the glass plate. The method comprises fixing the supporting pieces along the edge of the glass plate, moving the movable holding pieces on the supporting pieces so as to have the holding means disposed at positions prescribed for attachment of the molding and causing the molding to be pushed downwardly along the lateral face of the stepped portion until the holding means kept at the aforementioned positions for the attachment of the molding catch firm hold of the molding by the edge thereof.

By use of a device which is designed for the purpose of fixing a molding and which comprises supporting pieces adapted to be fixed along the edge of a glass plate attached to the stepped portion along the edge of the window frame and movable holding pieces retained slidably on the supporting pieces and adapted to get hold of the molding, the supporting pieces each provided with guides for permitting the corresponding movable holding piece to enjoy freedom of motion in a direction substantially perpendicular to the edge of the glass plate and protruding pieces having teeth formed on the lateral sides thereof and the movable holding pieces each provided with engaging portions adapted to be engaged with the guides of the corresponding supporting piece, meshing portions adapted to be coupled with the teeth of the supporting pieces so as to form a meshing element, and molding holding means adapted to hold in position the downwardly inserted molding down onto the movable holding piece supported in position on the supporting piece, the molding can be fixed along the edge of the window frame without reference to possible inconsistency of the space separating the edge of glass plate and the edge of the window frame by a method which comprises causing the movable holding pieces to be moved in such a way as to be pressed against the edge of the window frame and thereafter allowing the molding to be pushed down along the lateral face of the stepped portion formed along the edge of the window frame until the molding is fixed in position. For the purpose of replacement, the molding can be released from the fast engagement with the window frame by undoing the meshing portions formed by the movable holding pieces and supporting pieces for thereby allowing the movable holding pieces to be moved backward and liberating the molding from the firm hold by the movable holding pieces. A newly inserted molding can then be fixed in position by causing the movable holding pieces to be pressed in the direction of the window frame and thereafter pushing the molding downwardly along the lateral face of the stepped portion of the edge of the window frame.

The other objects and characteristic features of the present invention will become apparent from the description of invention to be given in detail herein below with reference to the accompanying drawing.

BRIEF EXPLANATION OF THE DRAWINGS

FIG. 5 is a perspective view of the second embodiment of the molding clip according to the present invention;

FIG. 6 is a disassembled perspective view of the third embodiment of the molding clip according to the present invention;

FIG. 8 is a disassembled perspective view of the fourth embodiment of the molding clip according to the present invention.

DETAILED DESCRIPTION OF THE INVENTION

Figure 1:
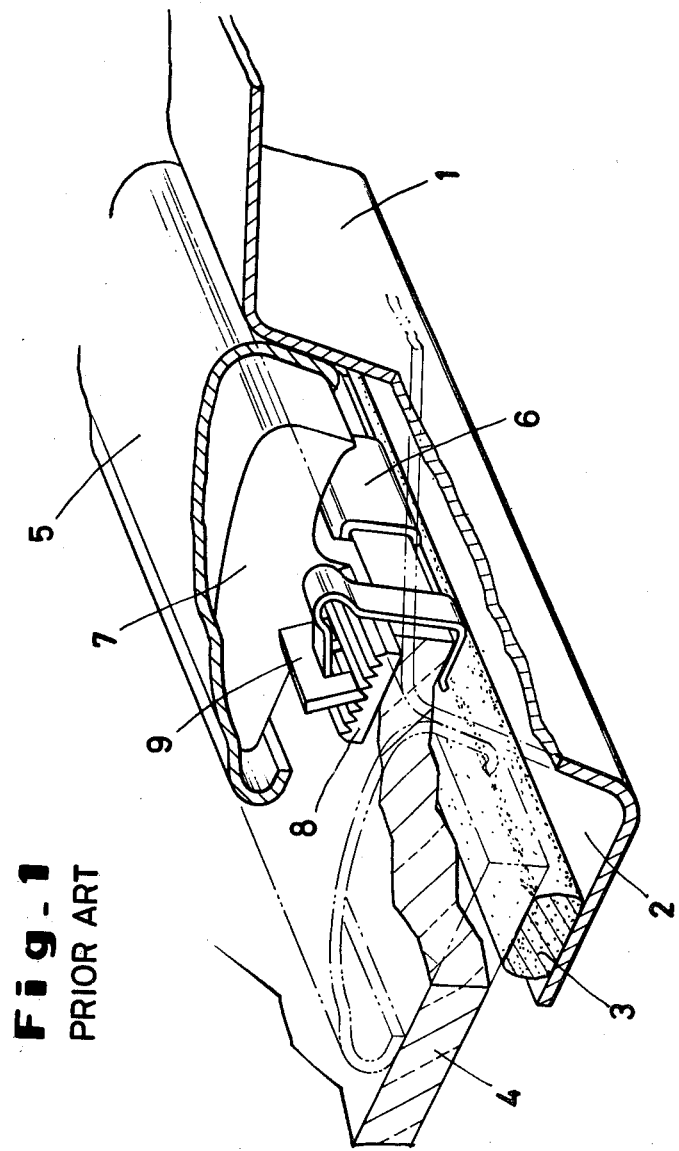
FIG. 1 is a partially cutaway view in perspective of a conventional molding clip.

With reference to the accompanying drawings, FIG. 1 represents a molding clip of the prior art to be used for fixing a molding along the edge of a glass plate in the windshield or rear window of an automobile for the purpose of decoration and protection. The window frame 1 such as in an automobile is bent in a stepped state as illustrated and the glass plate 4 is fastened to the edge portion 2 of the window frame 1 through the medium of adhesive 3. A molding clip of the construction shown in FIG. 1 has been proposed for the purpose of ensuring fast attachment of the molding 5 and for the additional purpose of preventing the glass plate 4 from having unwanted play in a gap possibly formed between the edge of the glass plate 4 and the window frame 1. This molding clip comprises a metal clip 6 attached to the edge of the glass plate 4 and a molding retaining piece 7 adapted to retain the molding 5 by hooked engagement. The molding retaining piece 7 is provided on its opposite side with a sharply corrugated catch piece 8, and the clip 6 is provided with a positioning piece 9 adapted to stand substantially vertically on either of the two inclined faces forming one sharp corrugation on the catch piece 8. Once the positioning piece is meshed with the catch piece, the molding retaining piece 7 is allowed to move only in one direction (in the direction of the window frame 1 in the state illustrated).

After the clip 6 of the molding clip of the construction described above has been attached to the edge of the glass plate 4 and inserted into the window frame 1, the molding retaining piece 7 is brought into engagement with the clip 6 and pushed in until the molding collides into the window frame. Consequently, the glass plate is prevented from developing play in the gap between the edge of the glass plate and the window frame, enabling the glass plate to be attached fast.

With the molding clip of this construction, the molding must be fastened to the retaining piece 7 before the clip 6 is brought into engagement with the retaining piece 7. As already described, the engagement of the clip 6 with the piece 7 turns out to be very difficult work.

Figure 2:
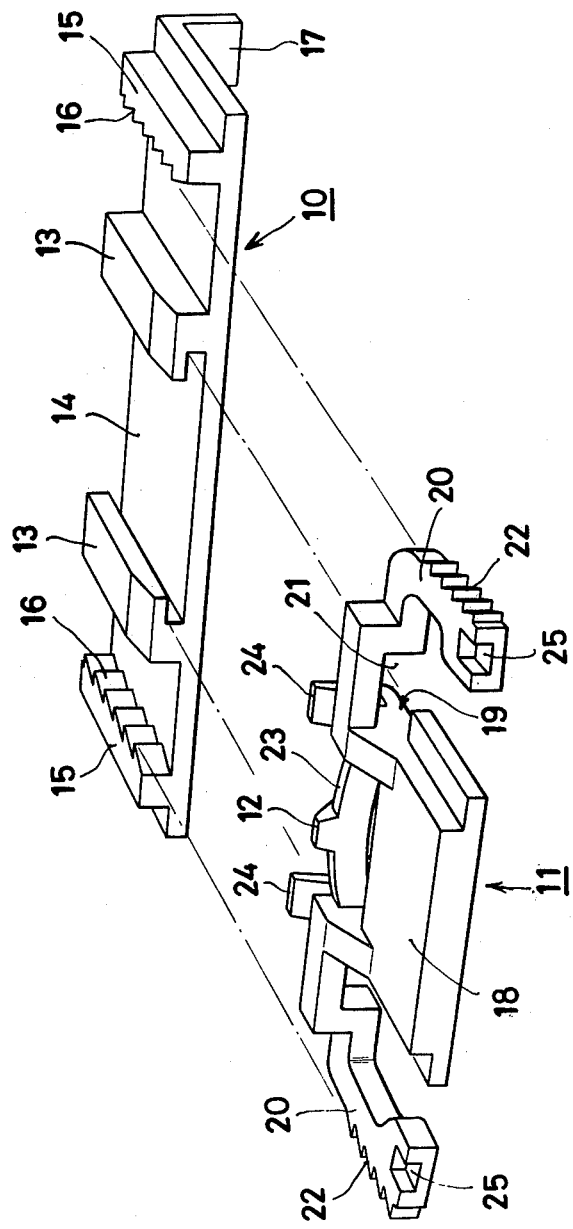
FIG. 2 is a disassembled perspective view of the first embodiment of the molding clip according to the present invention.
Figure 3:
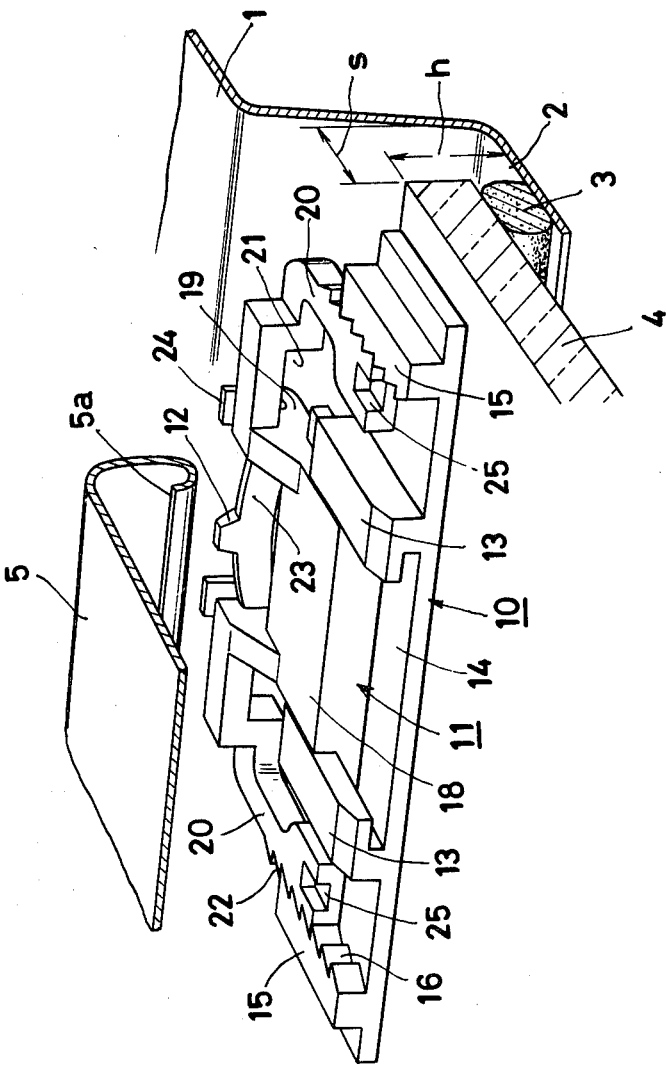
FIG. 3 is an assembled perspective view of the molding clip of FIG. 2.
Figure 4:
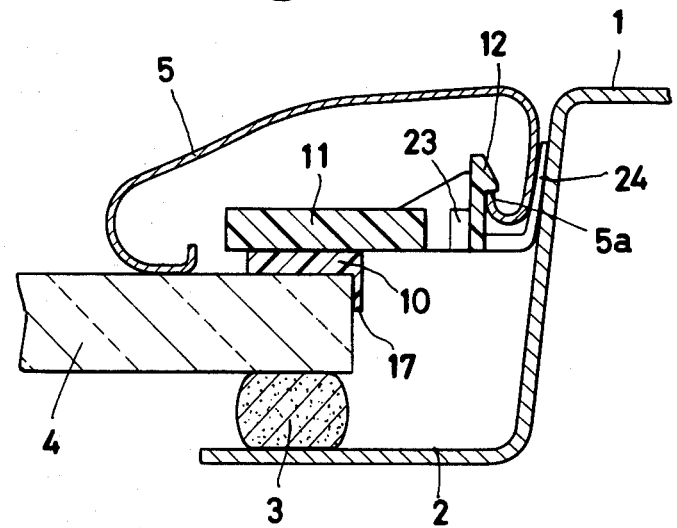
FIG. 4 is a sectional side view of the molding clip of FIG. 2, illustrated in a state holding a molding fast in position.

The molding clip of the present invention eliminates this drawback, permits the work to be performed efficiently and provides safe attachment of the molding. FIGS. 2 to 4 illustrate the first embodiment of the molding clip of the present invention, which comprises the two major components; a supporting piece 10 and a movable holding piece 11. When the glass plate 4 is fastened through the medium of adhesive 3 to the edge portion 2 of a window frame which is formed by pressing a stepped portion along the edge of the window frame 1 such as in an automobile, there is a possibility that the glass plate will deviate from its correct position so that the space "s" separating the edge of the glass plate and the lateral face of the stepped portion will become improper. Also, the layer of adhesive may become of ununiform thickness and give rise to an undesirable deviation in the height "h" from the bottom of the stepped portion to the outer surface of the glass plate (FIG. 3).

In order that the molding 5 may be brought into fast engagement simply by a downward push without reference to the variations in the magnitude of the space "s" and the height "h" and that the molding already held in engagement may be detached rather easily when necessary, the molding clip of the present invention makes use of a supporting piece 10 adapted to be fixed to the edge of a glass plate 4 such as with adhesive or double-faced adhesive tape and of a movable holding piece 11 provided with a holding claw 12 serving to grasp the molding 5 pushed in downwardly along the lateral face of the stepped portion. The movable holding piece 11 is supported movably on the supporting piece 10 in such a way that the holding claw 12 can be adjusted to compensate for any variation in the space "s". Desired fixing of the molding is accomplished by fixing a required number of supporting pieces 10 at suitable intervals to the edge of the glass plate, allowing as many movable holding pieces 11 to be moved on the supporting pieces so as to be pressed in the direction of the lateral face of the stepped portion of the window frame until the holding claws 12 are brought to position prescribed for attachment of the molding, pushing the molding 5 downwardly with the outer edge of the molding kept in sliding contact with the lateral face of the stepped portion until the holding claws 12 firmly grasp the inserted molding, with the result that the molding securely rests so as to bridge the opening formed between the lateral face of the stepped portion and the edge of the glass plate.

In the embodiment illustrated in FIGS. 2 to 4, the supporting piece 10 which comprises a base plate 14, a pair of opposed guides 13 disposed on the base plate parallelly to each other, each of which guides has a cross section of the shape of an inverted "L", and a pair of protruding strips 15 disposed substantially parallel to each other outside the guides on the base plate and possessed of a row of saw teeth 16 each on the opposed lateral faces thereof is integrally molded of a synthetic resin. The supporting piece 10 is provided at the front edge thereof with a downwardly projecting piece 17. A required number of supporting pieces 10 are fixed at proper intervals to the edge of a glass plate through the medium of adhesive or double-faced adhesive tape as described above, with the projecting pieces 17 thereof kept in hooked engagement with the edge face of the glass plate. The movable holding piece 11 which comprises a main body member 18 which in this embodiment is a plate-like element having the opposite lateral edges thereof held in the opposed guides 13 of the supporting piece in such a way as to give the body member freedom of motion in the forward and backward directions, a pair of projecting portions 19 thrusting forward like horns from the body member 18 and a pair of flexible arms 20 each slightly extending outwardly from the corresponding projecting portion and thereafter extending backwardly substantially in parallel with the corresponding lateral edge of the body member 18 is also molded integrally of a synthetic resin. The outwardly extending portions which form the basal parts of the arms 20 contain notches 21 for permitting uninterrupted passage of the guides 13 of the corresponding supporting pieces 10 and the portions of the arms extending backwardly substantially in parallel with the lateral edges of the body member 18 are provided on the external faces thereof with teeth 22 adapted to be meshed with the saw teeth 16 formed on the protruding strips 15 of the supporting pieces 10 and the dents 25 at the free ends thereof. The arms 20 and the teeth 22 jointly form meshing portions. In front of the body member 18, there is located a connecting strip 23 serving to join the two projecting portions 19. At the center in the front side of the connecting strip 23, there is provided a holding claw 12. Alternatively, the front end of the body member 18 may be extended as far as the forward end of the projecting portion 19 so as to have the holding claw 12 provided directly on the extended end of the body member 18. In the embodiment under discussion, the holding claw 12 is provided on the connecting strip 23 so that the resiliency of the connecting strip may be effectively utilized in bringing the molding into fast attachment. This explains why the connecting strip 23 is not in a straight shape. For the resiliency of the connecting strip to be advantageously manifested, the connecting strip is desired to be made of a flexible material in the shape of an arch with the highest point of the bend pushed forward as illustrated. In the present embodiment, combination positioning and protecting pieces 24 each having an L-shaped cross section are extended from the leading ends of the projecting portions 19 until they protrude beyond the holding claw 12. Since the engaging portion 5a of the molding has an edge with a hook-shaped cross section as illustrated, the holding claw 12 has the shape of a claw as illustrated. When the engaging portion of the molding has a different cross section, the shape of the holding claw will naturally be determined to conform to the cross section.

It follows that the supporting piece 10 may be fixed to the edge of the glass plate 4 while in a state having the corresponding movable holding piece 11 already attached thereto or the supporting piece 10 may be fixed in advance to the edge of the glass plate and the corresponding movable holding piece subsequently attached to the supporting piece. To attach the movable holding piece 11 to the supporting piece 10 which has already been fixed to the edge of glass plate, the plate-like body member 18 of the movable holding piece 11 poised behind the supporting piece is slid in between the opposed guides 13 while the notches 21 at the basal parts of the arms 20 remain astraddle the guides 13 and, at the same time, the free end sides of the arms 20 slide against the inner faces of the protruding strips 15. Consequently, the opposed arms 20 move forward in conjunction with the plate-like body member 18, with the teeth 22 coming into contact with one after another of the rows of teeth 16 formed on the inner faces of the protruding strips 15, until the combination positioning and protecting pieces 24 collide into the lateral face of the stepped portion of the window frame 1. When the two pieces are joined consequently, the holding claw 12 is automatically brought to a position confronting the lateral face of the stepped portion where it is ready for attachment of the molding 5. Then, the molding 5 is pushed in downwardly so that the engaging edge 5a of the molding will push back the claw 12 by overcoming the resiliency of the connecting strip 23 and finally snap into fast engagement with the claw 12. At the moment that the engaging edge 5a moves past the claw 12 and reaches the underside thereof, the resiliency of the connecting strip 23 causes the claw 12 to snap into hooked engagement with the engaging edge 5a and get firm hold of the engaging edge, with the result that the molding is attached fast to the holding piece. In this case, since the combination positioning and protecting pieces 24 are held in direct contact with the lateral face of the stepped portion, they serve the purpose of keeping the engaging edge 5a of the molding from directly coming into contact with the lateral face of the stepped portion, namely the surface of the coated panel of the automobile body. Thus, there is absolutely no possibility of the coated surface of the automobile panel being injured by the molding.

The release of the molding from the fast attachment is accomplished by prying up the inner side edge of the molding which is held in contact with the edge of the glass plate, inserting a suitable tool through the opening formed beneath the raised part of the molding, pinching the dents 25 of the free ends of the arms 20 with the tool to disengage the teeth 22 from the rows of teeth 16 and pulling the holding piece 11. Consequently, the claw 12 lets go its firm hold of the engaging edge 5a of the molding, enabling the molding to be removed upwardly.

In the present embodiment, the teeth 16, 22 are desired to be formed in the shape of saw teeth so that the movable holding pieces may be easily moved forward relative to the supporting pieces but cannot easily be moved backward. Thus, at the time that the molding is attached to the glass plate, the saw teeth are securely meshed to prevent the movable holding pieces from being moved backwardly.

FIG. 5 represents the second embodiment of the molding clip of the present invention, to be used for fixing to the window frame 1 a molding 5 which is molded of a synthetic resin in a construction containing a grooved strip 5b with a dovetail-shaped or curved cross section in the longitudinal direction at the center on the inner side. Since this molding is different from that which is attached fast to the glass plate 4 by its engaging edge in the first embodiment, the movable holding pieces 11 have slightly different holding means notwithstanding the fact that the supporting pieces 10 are similar. To be specific, in place of the holding claw 12 and connecting strip 23 used in the foregoing embodiment, the movable holding piece 11 of the present embodiment is provided on the plate-like body member 18 thereof with a vertically raised pin 27 having a cross section substantially identical with the cross section of the grooved strip 5b of the molding.

The attachment of the molding, therefore, is accomplished by moving the movable holding piece 11 on the supporting piece 10 until this pin 27 is brought to a stated position, pushing the molding 5 downwardly and inserting the grooved strip 5b around the pin 27. Since this molding is made of a synthetic resin, even when it is suffered to collide into the panel of the automobile body while it is being pushed down, it has no possibility of doing any harm to the coated surface of the panel. Although the upwardly raised portions of the combination positioning and protecting pieces 24 may be omitted for the reason just described, the forwardly projecting positioning pieces should be retained so that when their leading ends collide into the lateral face of the stepped portion, the pin 27 is automatically brought to a position stated for attachment of the molding. Further in the present embodiment, the arms 20 are provided with elbows 26 which are extended outwardly over the protruding strips 15 and past the opposite lateral edges of the supporting piece, then bent downwardly and terminated in a level substantially flush with the upper surface of the glass plate. These elbows 26 are intended to be pinched with a suitable tool during the removal of the molding, so that the arms 20 will be bent inwardly and the teeth 22 of the arms released from fast engagement with the teeth 16 of the protruding strips 15. This is done simply by inserting the tool along the upper surface of the glass plate and then allowing the elbows to be pinched with that tool. Accordingly, the removal of the molding by means of these elbows is much easier to accomplish than by means of the arms of the foregoing embodiment which are so constructed that the location of the arms must inevitably rely upon blind search of the dents 25 or protuberances formed at the free ends of the arms 20 with the tips of the tool. The other parts of the molding clip of the present embodiment which are structurally identical with the corresponding parts used in the first embodiment are denoted by the like symbols and the explanation of these parts is omitted here to avoid repetition.

Figure 7:
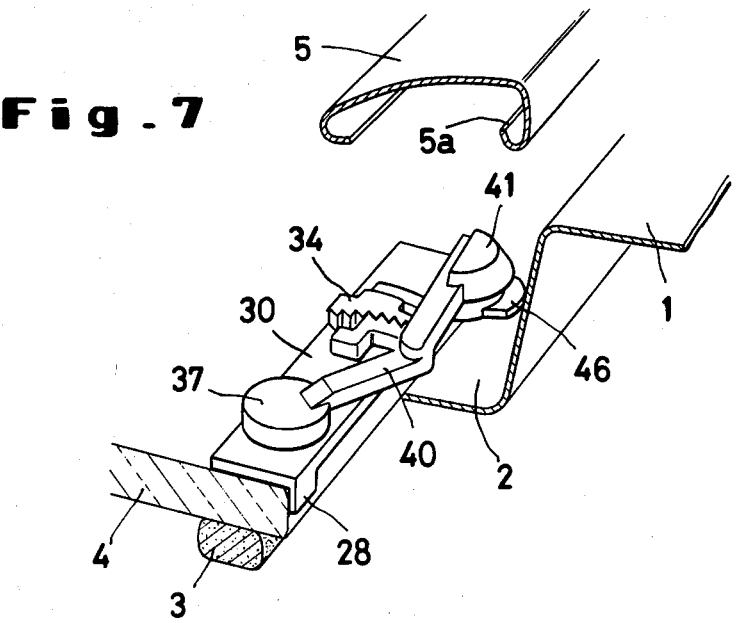
FIG. 7 is an assembled perspective view of the molding clip of FIG. 6.

FIGS. 6–7 represent the third embodiment of the molding clip of this invention, to be used for the attachment of a molding having the same engaging edge 5a as that used in the first embodiment.

In this third embodiment, the supporting piece 10 and the movable holding piece 11 are also molded of a synthetic resin. The supporting piece 10 is integrally provided at the front edge thereof with a downwardly projecting piece 28. With this projecting piece 28 secured in hooked engagement with the edge face of the glass plate 4, the supporting piece is fixed through the medium of adhesive or double-faced adhesive tape 3 to the edge of the glass plate. In one part of the upper face 30 of the supporting piece 10, a circular base 29 is raised. The circular base 29 contains on its reverse side a circular cavity 31 which opens into the lower face thereof. A circular hole 32 is formed at the center in the upper wall of the circular base 29. This circular hole 32 communicates with a slot 33 formed in the diametric direction of the circular base 29. In the other part of the upper face 30 of the supporting piece 10, an arcuate protruding strip 34 is raised at a given distance from the circular base 29 in such a way that the bend of this strip falls completely in the locus of a circle to be drawn with the circular hole 32 as the center. On either of the concave lateral face and the convex lateral face (the former face in the present embodiment) of the arcuate protruding strip 34, there is formed a row of saw teeth 35. On the remaining lateral face, there is provided a protruding strip 36 of the shape of a cap's visor. In this third embodiment said circular base 29 and said circular hole 32 when taken in combination with said strips 34 and 36 serve as the guides equivalent to said guides 13 mentioned above.

The movable holding piece 11 is provided at one end thereof with a circular cap 37 containing therein a circular recess conforming with the upper contour of the circular base 29. From the center of the lower face of the upper wall of this cap 37, a shaft 38 adapted to pass through the circular hole 32 hangs down. This shaft 38 is provided at the lower end thereof with a projection 39 adapted to pass through the slot 33. The movable holding piece, therefore, can be joined with the supporting piece so as to be pivotally moved around the circular hole 32 and the shaft 38 by aligning the direction of the projection 39 with that of the slot 33, passing the shaft 38 through the circular hole 32 and simultaneously allowing the projection 39 to pass downwardly through the slot 33 and causing the circular cap 37 to cover completely the circular base 29 on the supporting piece.

Further, the movable holding piece 11 is provided with an arm 40 extending from the circular cap 37. This arm 40 is provided at the leading end thereof with a semicircular holding member 41 of which the face along the semicircular arc assumes the shape of a jaw. From along the middle of the arm 40, a first arcuate arm 42 possessing teeth 43 adapted to be meshed with the row of teeth 35 on the arcuate protruding strip 34 and a second arcuate arm 44 possessing a protuberating strip 45 adapted to be slid under the visor-shaped flange or portion 36 of the arcuate protruding strip 34 are extended in partially circular paths with the shaft 38 as the common center. By joining the movable holding piece pivotally with the supporting piece and then rotating the movable holding piece for thereby allowing the teeth 43 of the first arcuate arm 42 to be meshed with the teeth 35 of the strip 34 and the flange or strip 45 to be slid under the visor-shaped protruding portion 36, therefore, the jaw-shaped holding member 41 can be brought to a position stated for the attachment of the molding, i.e. the position confronting the lateral face of the stepped portion of the panel on the automobile body. After the holding member 41 has assumed this position, the molding can be brought into fast engagement with the holding member 41 by causing the engaging edge 5a thereof to be slid down the lateral face of the stepped portion. As will be readily appreciated, shaft 38 carrying projection 39 when taken in combination with arm 44 carrying flange 45 serve as the main body member equivalent to the plate-like main body member 18 mentioned above.

Also in the case of the present embodiment, the teeth 35 and 43 are desired to be in the shape of saw teeth so that the movable holding piece 11, while in motion in the direction of bringing the holding member 41 toward the lateral face of the stepped portion, is allowed to slide smoothly and the same holding piece, while the engaging edge 5a of the molding 5 is being pushed down, is not allowed to move backwardly. From the leading end of the arm 40 at a level below the lower face of the jaw-shaped holding member 41, a projecting piece 46 may be extended so much as to outstretch the front edge of the holding member 41. Consequently, the holding member 41 can be automatically caused to assume a position determined for the attachment of the molding, namely a position separated by a fixed distance from the lateral face of the stepped portion when the movable holding piece is rotated until the front edge of the projecting piece 46 collides into the lateral side of the stepped portion. In this case, the front edge of the projecting piece 46 is partially circularly curved in a concentrically relationship with the front edge of the holding member 41.

It is self-evident that also in the case of the present embodiment, the pin 27 illustrated in the embodiment of FIG. 5 may be raised from the arm 40 so as to provide secure attachment of a molding of the type possessed of a grooved strip 5b.

The separation of the molding from the molding clip of this embodiment is accomplished by prying the edge of the molding from the edge of the glass plate, inserting a suitable tool in the opening formed consequently under the lifted portion of the molding, causing the tool to pinch the rear end of the first arm 42, twisting the first arm in such a way as to disengage the teeth 35 and 43 and moving the movable holding piece in the reverse direction.

In the embodiments so far described, the movable holding pieces are invariably provided with flexible arms having saw teeth formed on their lateral faces. Alternatively, as in the fourth embodiment illustrated in FIG. 8, necessary flexibility may be imparted to the protruding strips 15 of the supporting piece 10 by having the portions 15' of the protruding strips 15 integrally joined with the base plate 14 and the remaining portions thereof separated by a proper space from the base plate and, at the same time, the arms 20 which are extended outside the opposite lateral edges of the main plate-like body member 18 of the movable holding piece 11 may be designed so that they will be supported on the forward and rear sides by the main plate 18. The relationship between these arms 20 and the protruding strips 15 in this embodiment is identical with that of the other embodiments. Advantageously in this case, the protruding strips 15 may be disposed in a slightly diverging pattern so that they will be pushed open by the opposed rows of saw teeth 22 of the movable holding piece 11 while the movable holding piece is slid into the supporting piece 10 for desired union. When such protruding strips 15 are pushed open by the saw teeth because of the union between the two pieces 10 and 11, they tend to resume their original, slightly diverging pattern and, by virtue of the resultant resiliency, force the saw teeth 16 to come into tight engagement with the saw teeth 22 of the movable holding piece, with the result that the strength of the union will be greatly enhanced. In the construction illustrated in FIG. 8, there are additionally provided elbows 47 adapted to be hooked by the tool which is used to pry and open the protruding strips 15 during the removal of the molding. Besides, the arms 20 of the movable holding piece are provided with notches 48 similar in function and shape to those 21 in the first embodiment, so as to permit uninterrupted passage of the guides 13 of the supporting piece 10.

Consequently, the removal of the molding is accomplished by opening the protruding strips 15 outwardly with a prying force exerted upon the elbows 47 and pulling the movable holding piece 11 outwardly. In the present invention, since the movable holding piece provided with the holding member is supported in position by the supporting piece which is fixed onto the glass plate as described above, the molding can be attached to the glass plate and the encircling window frame without reference to possible variations in the height "h". Any variation in the space "s" can be absorbed by moving the movable holding piece supported in position on the supporting piece for thereby bringing the holding member to a position which falls within the range of motion allowed for the movable holding piece and which is stated for the required attachment of the molding. Unlike the prior art which involves a troublesome work of fixing clips on the glass plate at positions carefully selected to correspond exactly to the positions at which the receiving means are fixed on the molding, the molding clip of the present invention enjoys an advantage that the desired fast attachment of the molding can be obtained by merely pushing the molding down subsequently to a simple work of fixing supporting pieces on the glass plate and moving the movable holding pieces on the supporting pieces until the holding means are brought to their respective positions stated for the required attachment of the molding. Thus, the device of this invention makes a striking contribution to operational efficiency. The molding thus brought into fast attachment can be removed, when necessary, by prying the inner edge of the molding which is in contact with the glass plate, inserting a simple tool under the opening consequently formed under the lifted portion of the molding, and moving the movable holding piece with the inserted tool for thereby removing the holding member from the stated position.

The present invention has been described with reference to several embodiments. It should be noted that this invention is not limited to these embodiments but may be modified in various ways without departing from the technical idea defined in the claims for patent.

What is claimed is:

1. A device for fastening a molding to the edges of a glass plate and a window frame, which comprises:
    a supporting piece to be fastened to the edge of said glass plate to be attached to a stepped portion formed along the edge of said window frame and
    a movable holding piece to be slidably held on said supporting piece,
    said supporting piece including a base plate, guides disposed on said base plate for permitting said movable holding piece to be moved only in directions substantially perpendicular to the edge of said glass plate and at least one protruding strip disposed on said base plate and possessed of teeth on the lateral face thereof,
    said movable holding piece including a main body member having at least the opposite lateral edges thereof held in said guides of said supporting piece, at least one arm having teeth to be meshed with said teeth of said supporting piece for thereby forming meshing portions and holding means for holding said molding inserted downwardly into position onto said movable holding piece held on said supporting piece.

2. The device according to claim 1, wherein said movable holding piece is further provided with protecting pieces extending from said main plate toward the lateral faces of said stepped portion of said window frame, whereby the direct contact of said protecting pieces with the lateral faces of said stepped portion permits said holding means to be kept at a fixed distance from the lateral faces of said stepped portion.

3. The device according to claim 1, wherein each of said meshing portions comprises a plurality of saw teeth for permitting said movable holding piece to be moved in the direction of the lateral faces of said stepped portion of said window frame and for preventing said movable holding piece from being inadvertently moved in the opposite direction.

4. The device according to claim 1, wherein there are at least two of said protruding strips which are provided with teeth and are given flexibility in a direction parallel to the surface of said glass plate.

5. The device according to claim 1, wherein said at least one arm provided with said teeth is given flexibility in a direction in parallel to the surface of said glass plate.

6. The device according to claim 5, wherein said at least one arm have formed therein members to be hooked by a tool inserted along the edge of said molding held in contact with the surface of said glass plate, whereby said meshing portions are released by causing said at least one flexible arm to be bent by means of said tool hooked on said members.

7. The device according to claim 1, wherein said holding means comprises a claw formed on the side of said movable holding piece confronting the lateral faces of said stepped portion of said window frame.

8. The device according to claim 1, wherein said holding means comprises a pin-shaped protuberance raised vertically from said main plate of said movable holding piece.

9. The device according to claim 1, wherein said guides comprise two projected strips disposed perpendicularly relative to the edge of said glass plate and possessed of a cross section of the shape of an inverted "L", said protruding strips possessed of said teeth are disposed parallelly to each other with the toothed sides thereof opposed to each other, and said arms are provided on the outer faces thereof with said teeth and are extended outwardly each in the shape of a letter L from the front part of said main plate.

10. The device according to claim 1, wherein one of said guides of the supporting piece is formed in the shape of a circular projection having a circular hole, the other of said guides having an arcuate configuration, and one portion of said movable holding piece is formed in the shape of a circular cap having a projection as a portion of said main body member for fitting in said circular hold so as to cause said circular cap to be rotatably engaged with said circular projection and an arm serving as the other portion of said main body member and extending from said cap, said arm having an arcuate lateral extension for engagement with said other guide, said arm further including said holding means thereon.

11. The device according to claim 1, wherein said guides comprise two projected strips disposed substantially perpendicular relative to the edge of said glass plate and having a cross section of the shape of an inverted "L", said at least one protruding strip possessed of said teeth being two in number and disposed in converging relation to the edge of said glass plate and pivoted at their opposite or divergent ends, and said at least one arm being two in number and resiliently bowed in configuration and provided on the outer convex faces thereof with said teeth, said arms are each fastened at opposite ends thereof and adapted to have their bowed configuration flex to insure positive aggressive meshing with said protruding strips teeth.

12. A method for fixing a molding along the edges of a glass plate and a window frame by forming a stepped portion along said edge of the window frame, setting the glass plate to the bottom of the stepped portion through a medium of an adhesive layer and fastening thereto the molding in such a way as to conceal from view the space interposed between the edge of the glass plate and the lateral face of the stepped portion, which method comprises using a device formed of a supporting piece adopted to be fastened to the edge of said glass plate, and a movable holding piece to be slidably held on said supporting piece, said supporting piece including a base plate, guides disposed on said base plate for permitting said movable holding piece to be moved only in directions substantially perpendicular to the edge of said glass plate and at least one protruding strip disposed on said base plate and possessed of teeth on the lateral face thereof, said movable holding piece including a main body member having at least the opposite lateral edges thereof held in said guides of said supporting piece, at least one arm having teeth to be meshed with said teeth of said supporting piece thereby forming meshing portions and holding means for holding said molding, fastening said supporting piece to the edge of said glass plate, moving the movable holding piece on the supporting piece to thereby dispose the holding means in a position adjacent said stepped portion for fastening the molding in a predetermined position, then inserting downwardly the molding generally perpendicular to said glass plate along the lateral face of said stepped portion and causing the holding means disposed at said predetermined positions to engage and hold the edge of the inserted molding.

* * * * *